US007856228B2

(12) United States Patent
Lekutai et al.

(10) Patent No.: US 7,856,228 B2
(45) Date of Patent: Dec. 21, 2010

(54) MEASUREMENT, COLLECTION, DISTRIBUTION AND REPORTING OF ATMOSPHERIC DATA

(75) Inventors: Gaviphat Lekutai, Kirkland, WA (US); Mark Daniel Borges, Lake Stevens, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 550 days.

(21) Appl. No.: 11/365,942

(22) Filed: Feb. 28, 2006

(65) Prior Publication Data

US 2008/0019299 A1    Jan. 24, 2008

(51) Int. Cl.
*H04L 29/06* (2006.01)
*G01W 1/00* (2006.01)

(52) U.S. Cl. .................................. 455/414.3; 340/601

(58) Field of Classification Search .............. 455/456.1, 455/456.2, 456.3, 456.4, 456.5, 414.1, 414.2, 455/404.1, 12.1, 414.3, 3.01; 370/328; 342/357.06; 340/905, 539.28, 7.48, 601, 602, 825.46
See application file for complete search history.

(56) References Cited

U.S. PATENT DOCUMENTS 5,831,570 A * 11/1998 Ammar et al. ............ 342/26 B
6,462,665 B1 * 10/2002 Tarlton et al. ............... 340/601
7,181,345 B2 * 2/2007 Rosenfeld et al. ............. 702/3
2005/0046584 A1 * 3/2005 Breed .................... 340/825.72
2005/0075116 A1 * 4/2005 Laird et al. ............. 455/456.3

* cited by examiner

Primary Examiner—Melody Mehrpour

(57) ABSTRACT

For improved reliability and relevancy of reporting of atmospheric condition data, faster access to the data, and more geographically granular collection of data, data pertaining to atmospheric conditions is measured at network towers, collected, managed, distributed and presented according to a requested service. Weather data is measured and collected at a granularity greater than previously existing systems by communicatively coupling and generally co-locating weather or atmospheric measuring instruments to existing mobile network towers, and collecting and distributing the data as part of enhanced services for end users. Accordingly, when weather data is collected from the measuring instruments placed on network towers according to the present invention, and aggregated at one or more servers, the weather data may be distributed to end users of the communications networks with greater relevancy. Any of the voice/data, control and broadcast channels of an applicable mobile communications network may be utilized.

42 Claims, 11 Drawing Sheets

Exemplary METAR Sites in
Washington State, USA

Exemplary Wireless Network Tower
Sites near Seattle, WA, USA

The Square Area Near Seattle,
WA depicted in Fig. 3A

MEASUREMENT, COLLECTION, DISTRIBUTION AND REPORTING OF ATMOSPHERIC DATA

FIELD OF THE INVENTION

The present invention is directed to wireless communication services. More particularly, the present invention is directed to systems and methods of reporting atmospheric data to wireless portable devices, such as mobile phones.

BACKGROUND OF THE INVENTION

Historically, people interested in learning about weather conditions relating to a particular area via portable wireless devices have had few options in terms of the granularity of result, and thus also in terms of how relevant the results are to the user. Anybody who has viewed a television or radio broadcast in a metropolitan area has experienced this shortcoming. For instance, a broadcast listener living in a suburb of Philadelphia may listen to a weather broadcast concerning the Philadelphia metropolitan area, but nonetheless receive a report that is not very relevant to the listener. For example, while the news station may report heavy snow of 8-12" for "center city", the particular Philadelphia suburb, in which the listener may reside or through which the listener may be commuting, may be receiving little or no snow at all. The problem compounds when one considers the number of listeners that reside in rural areas that are disconnected from the weather patterns of the greater metropolitan regions at large. In short, network news broadcasts are not granular enough to simultaneously describe relevant results to all of its viewers.

Thus, there is a need for a simple way for people interested in learning about weather conditions in a more relevant, localized way to have access to such information. Today, existing wireless devices can obtain weather information online from the world wide web, or the Internet, but these sources too are not as rich or localized as would be desired to avoid the presentation of potentially irrelevant weather information to a consumer of the weather information. Oftentimes, such Internet sites and services (e.g., www.weather.com, www.accuweather.com, Yahoo! Weather, etc.) ask the user to enter a zip code, or city location, to specify an area for the desired weather information. While the presentation of results based on a zip code may be adequate to some users to describe the weather conditions prevailing in certain metropolitan locations, where zip codes tend to be defined densely, such an approach may translate poorly to a user residing or passing through a rural location, where zip codes may be defined broadly to encompass a variety of different weather conditions at any one time.

The problem lies at least partially in the way the National Weather Service has historically reported weather data. In this regard, the National Weather Service observational grid, depicted in exemplary fashion in FIG. 1, consists primarily of "METAR" sites ("METAR" roughly translated into English from French stands for Aviation Routine Weather Report), typically located at airports at a nominal spacing of ~25 square miles (only the cyan colored squares are METAR stations). The data for FIG. 1 was retrieved online from the National Weather Service's online source (http://www-.wrh.noaa.gov/sew/newsea.php). In short, even if a user does have access to packet based services from a portable device, the weather data that is exposed online is not granular enough to always be meaningful.

Alternate techniques for directly measuring local weather environments in a more immediate and relevant/accurate fashion are thus desirable. It would be further desirable to provide versatility, connectivity, and accuracy of weather condition reporting via wireless mobile devices or similar portable devices. It would be further desirable to provide a service based on such weather condition reporting data to provide accurate localized data to portable device users. For users that do not have packet switch services (e.g., TCP/IP packet services) or access to other online services with their portable device, it would be advantageous to provide the above-described benefits to enable the delivery of weather reporting data because no alternatives, however slow or granular, exist for such users. It would be still further desirable to improve upon control/voice interfaces and infrastructures for portable wireless devices to enable the delivery of periodic measurements from a server node within a network to end users within the network based on their respective locations relative to nearest network towers.

SUMMARY OF THE INVENTION

For improved reliability and relevancy of reporting of atmospheric condition data, faster access to the data, and more geographically granular collection of data, systems and methods for measuring, collecting, managing, distributing and presenting data pertaining to atmospheric conditions are provided. Weather data is measured and collected at a granularity greater than previously existing systems by communicatively coupling and generally co-locating weather or atmospheric measuring instruments to existing mobile network towers, and collecting and distributing the data as part of enhanced services for end users. For the vast majority of the population, due to the needs of users of communications networks, the granularity of existing mobile network towers is more detailed than the granularity of METAR sites utilized by the National Weather Service. Accordingly, when weather data is collected from the measuring instruments placed on network towers according to the present invention, and aggregated at one or more servers, the weather data may be distributed to end users of the communications networks with greater relevancy to those end users. Moreover, the distribution and reporting of the weather data of the invention does not rely on the need for TCP/IP network connectivity, since voice/data, control and broadcast channels of an applicable mobile communications network may be utilized.

DETAILED DESCRIPTION OF ILLUSTRATIVE EMBODIMENTS

Overview

Figure 1:
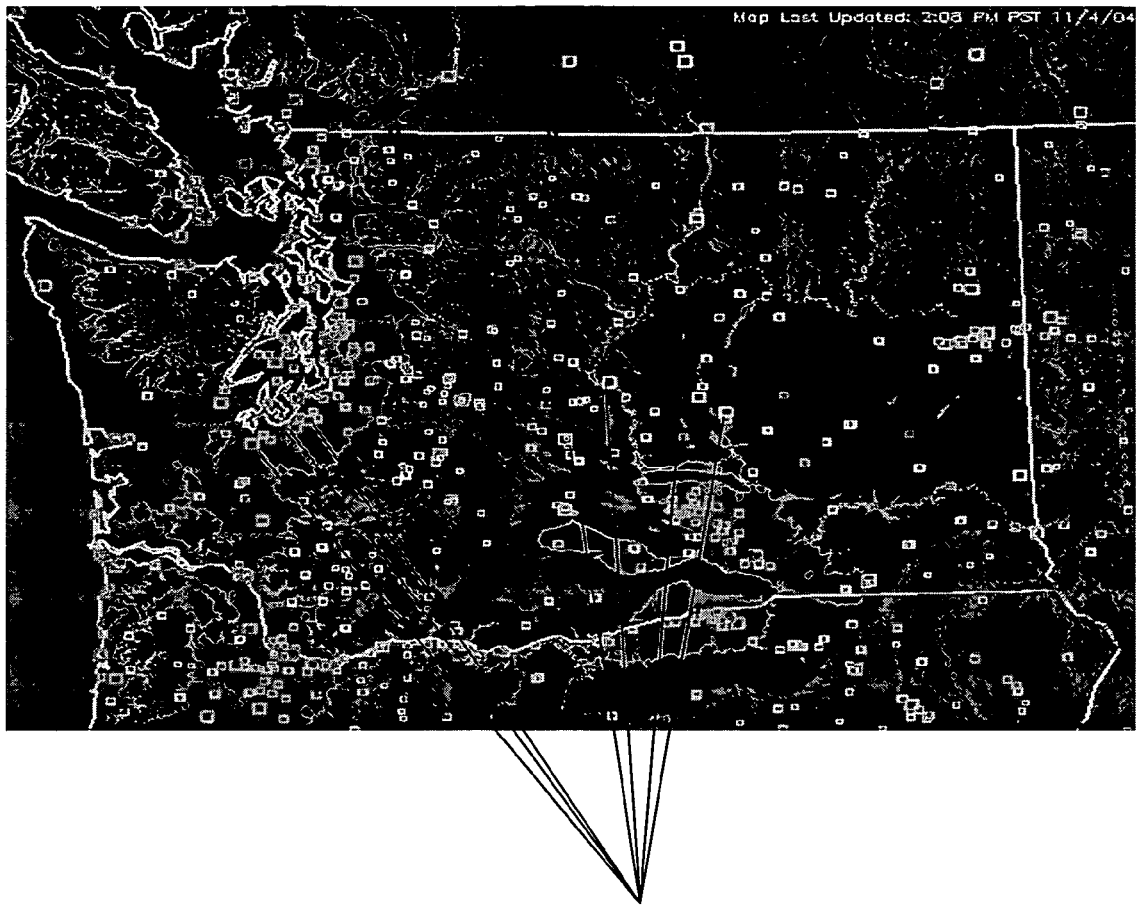
FIG. 1 illustrates an observational grid utilized by the National Weather Service illustrating existing granularity of weather measurement services.

As described in the background, while weather stations and weather web sites exist, there are a number of shortcomings of such system associated with reliability/relevancy of the data, immediacy of access to the data, and overall granularity of the regional weather data that is received according to such existing techniques.

In consideration of the above-described shortcomings, the invention provides an alternative technique that directly measures local weather environments in a more accurate fashion. In various embodiments described below in more detail, the invention provides systems for measuring weather data at a granularity much greater than previously existing systems by pairing weather station data directly with mobile handsets and by providing weather measurement devices at or near existing network towers.

The invention thus provides versatility, connectivity, relevancy and accuracy of weather station reporting via wireless mobile or similar devices. Via various non-limiting embodiments described below, the invention enables weather reporting services such that users of portable devices, such as voice users of a cellular phone, do not have to switch to packet switch services (if the users even have such packet switch services). In one non-limiting embodiment, the invention provides an architecture that improves upon existing control/voice interfaces and infrastructures to send specific periodic measurements to a weather reporting server node, which aggregates and manages weather reporting data on behalf of the subscribers of the network. Since the invention improves upon existing interfaces and leverages existing towers for the placement of weather measurement devices, the invention enables weather reporting services via a wireless network for all end users who utilize the wireless network.

Automatic WWAN towers weather stations may be realized with a simple architecture change to wireless tower structures together with additional service nodes. The weather station device(s) can be integrated into the tower shelter which houses equipment for the base station subsystem, the radio network controller (RNC), or NodeB, and connects to control interfaces. Then, a new additional node, i.e., the "weather station server," is introduced, which collects weather station measurements periodically via the control/CS interfaces from most, or all, wireless tower locations nationwide.

Exemplary Non-Limiting Network and Operating Environments

The following description sets forth some exemplary networks and non-limiting operating environments for the weather data collection and reporting services of the present invention. The below-described operating environments should be considered non-exhaustive, however, and thus the below-described network architectures merely show how the services of the present invention may be incorporated into existing network structures and architectures. One can appreciate, however, that the invention may be incorporated into now existing or future alternative architectures for communication networks as well.

The global system for mobile communication ("GSM") is one of the most widely utilized wireless access systems in today's fast growing communication systems. GSM provides circuit-switched data services to subscribers, such as mobile telephone or computer users. General Packet Radio Service ("GPRS"), which is an extension to GSM technology, introduces packet switching to GSM networks. GPRS uses a packet-based wireless communication technology to transfer high and low speed data and signaling in an efficient manner. GPRS optimizes the use of network and radio resources, thus enabling the cost effective and efficient use of GSM network resources for packet mode applications.

As one of ordinary skill in the art can appreciate, the exemplary GSM/GPRS environment and services described herein can also be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000 3x"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that shall become available in time. In this regard, the techniques of the invention may be applied independently of the method of data transport, and does not depend on any particular network architecture, or underlying protocols.

Figure 2A:
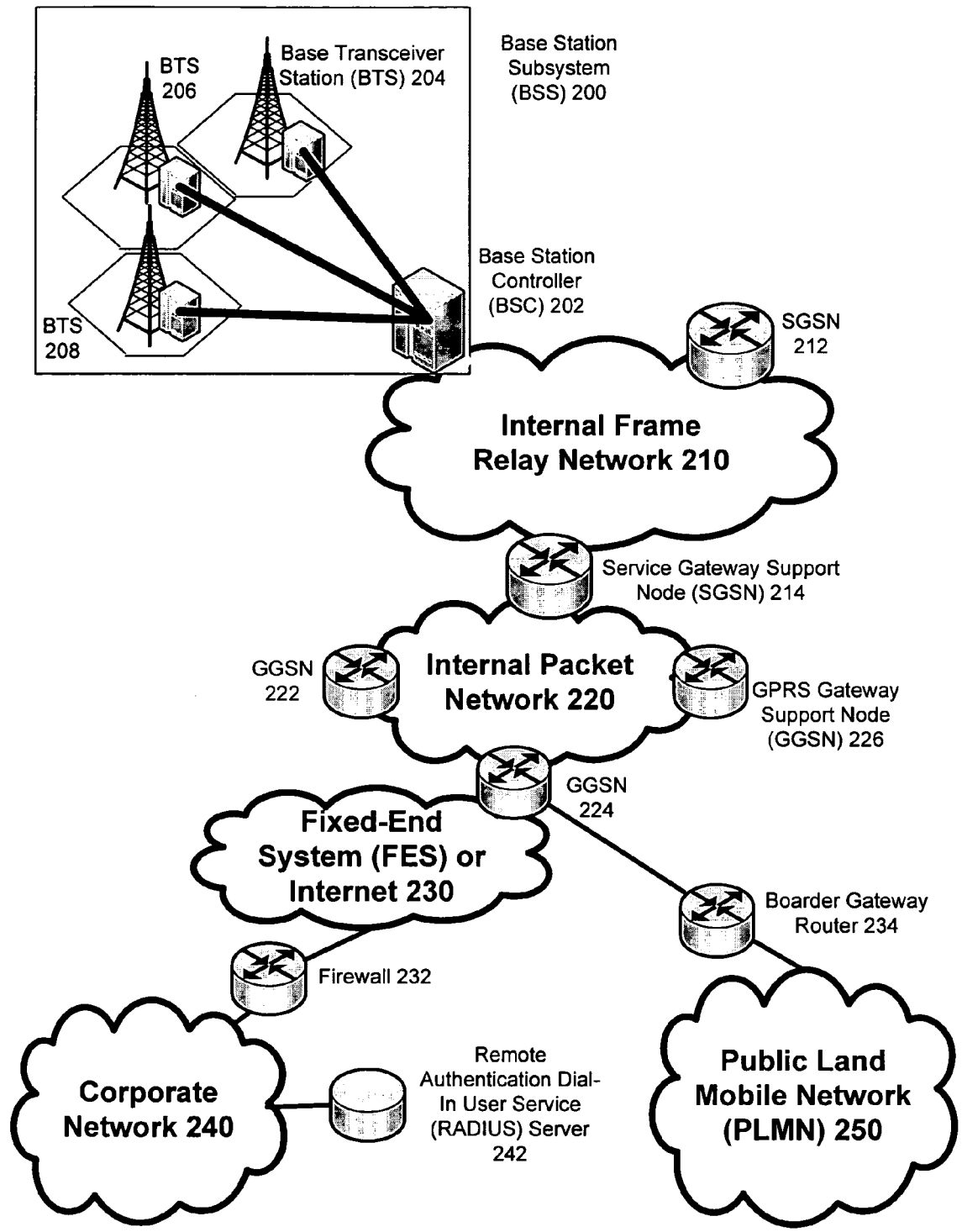
FIG. 2A illustrates an overview of a network environment suitable for service by embodiments of the invention.

FIG. 2A depicts an overall block diagram of an exemplary packet-based mobile cellular network environment, such as a GPRS network, in which the invention may be practiced. In such an environment, there are a plurality of Base Station Subsystems ("BSS") 200 (only one is shown), each of which comprises a Base Station Controller ("BSC") 202 serving a plurality of Base Transceiver Stations ("BTS") such as BTSs 204, 206, and 208. BTSs 204, 206, 208, etc. are the access points where users of packet-based mobile devices become connected to the wireless network. In exemplary fashion, the packet traffic originating from user devices is transported over the air interface to a BTS 208, and from the BTS 208 to the BSC 202. Base station subsystems, such as BSS 200, are a part of internal frame relay network 210 that may include Service GPRS Support Nodes ("SGSN") such as SGSN 212 and 214. Each SGSN is in turn connected to an internal packet network 220 through which a SGSN 212, 214, etc. can route data packets to and from a plurality of gateway GPRS support nodes (GGSN) 222, 224, 226, etc. As illustrated, SGSN 214 and GGSNs 222, 224, and 226 are part of internal packet network 220. Gateway GPRS serving nodes 222, 224 and 226 mainly provide an interface to external Internet Protocol ("IP") networks such as Public Land Mobile Network ("PLMN") 250, corporate intranets 240, or Fixed-End System ("FES") or the public Internet 230. As illustrated, subscriber corporate network 240 may be connected to GGSN 224 via firewall 232; and PLMN 250 is connected to GGSN 224 via boarder gateway router 234. The Remote Authentication Dial-In User Service ("RADIUS") server 242 may be used for caller authentication when a user of a mobile cellular device calls corporate network 240.

Generally, there can be four different cell sizes in a GSM network—macro, micro, pico and umbrella cells. The coverage area of each cell is different in different environments.

Macro cells can be regarded as cells where the base station antenna is installed in a mast or a building above average roof top level. Micro cells are cells whose antenna height is under average roof top level; they are typically used in urban areas. Pico cells are small cells having a diameter of a few dozen meters; they are mainly used indoors. On the other hand, umbrella cells are used to cover shadowed regions of smaller cells and fill in gaps in coverage between those cells.

Figure 2B:
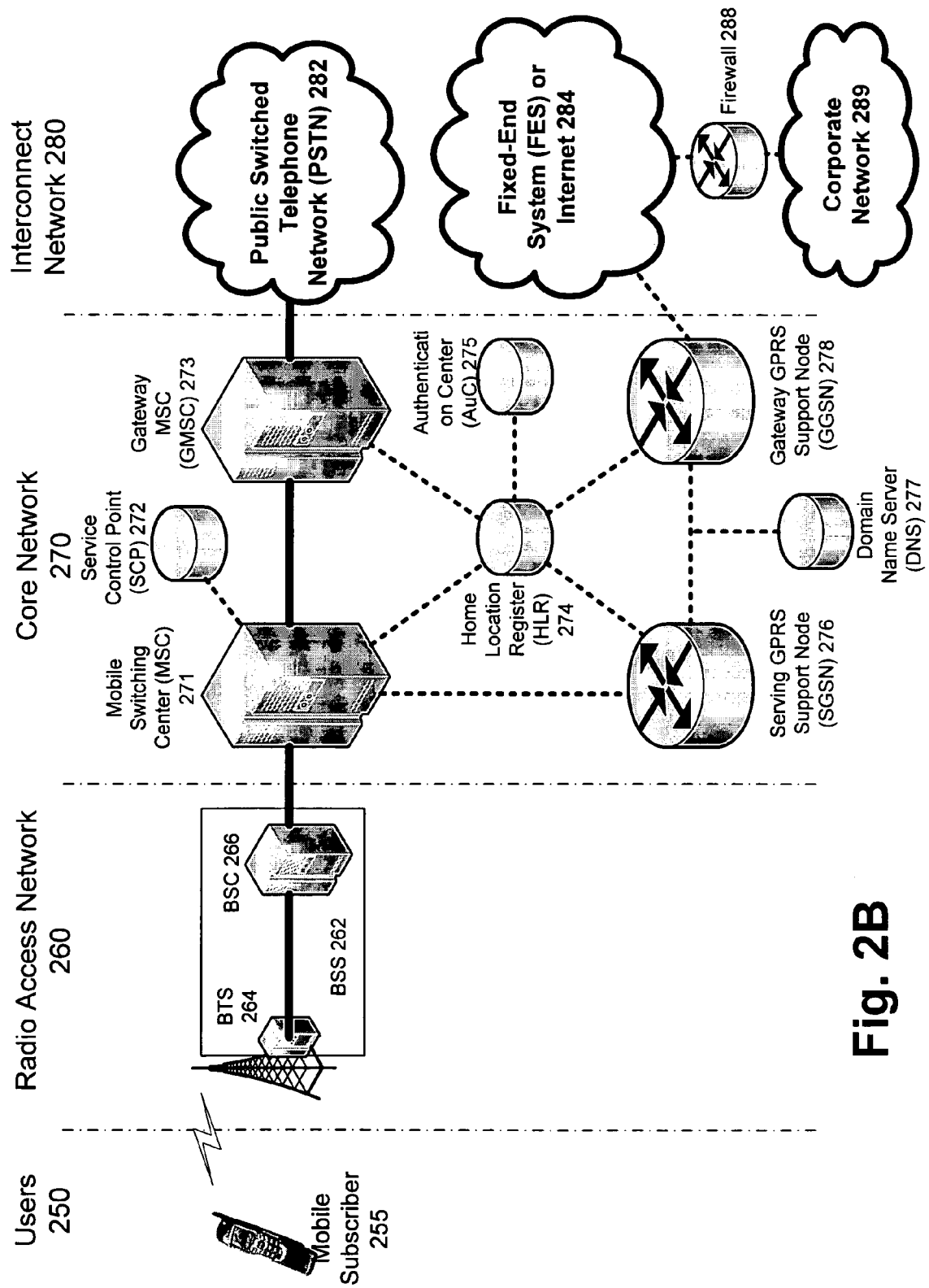
FIG. 2B illustrates a GPRS network architecture that may incorporate various aspects of the invention.

FIG. 2B illustrates the architecture of a typical GPRS network as segmented into four groups: users 250, radio access network 260, core network 270, and interconnect network 280. Users 250 comprise a plurality of end users (though only mobile subscriber 255 is shown in FIG. 2B). Radio access network 260 comprises a plurality of base station subsystems such as BSSs 262, which include BTSs 264 and BSCs 266. Core network 270 comprises a host of various network elements. As illustrated here, core network 270 may comprise Mobile Switching Center ("MSC") 271, Service Control Point ("SCP") 272, gateway MSC 273, SGSN 276, Home Location Register ("HLR") 274, Authentication Center ("AuC") 275, Domain Name Server ("DNS") 277, and GGSN 278. Interconnect network 280 also comprises a host of various networks and other network elements. As illustrated in FIG. 2B, interconnect network 280 comprises Public Switched Telephone Network ("PSTN") 282, Fixed-End System ("FES") or Internet 284, firewall 288, and Corporate Network 289.

A mobile switching center can be connected to a large number of base station controllers. At MSC 271, for instance, depending on the type of traffic, the traffic may be separated in that voice may be sent to Public Switched Telephone Network ("PSTN") 282 through Gateway MSC ("GMSC") 273, and/or data may be sent to SGSN 276, which then sends the data traffic to GGSN 278 for further forwarding.

When MSC 271 receives call traffic, for example, from BSC 266, it sends a query to a database hosted by SCP 272. The SCP 272 processes the request and issues a response to MSC 271 so that it may continue call processing as appropriate.

The HLR 274 is a centralized database for users to register to the GPRS network. HLR 274 stores static information about the subscribers such as the International Mobile Subscriber Identity ("IMSI"), subscribed services, and a key for authenticating the subscriber. HLR 274 also stores dynamic subscriber information such as the current location of the mobile subscriber. Associated with HLR 274 is AuC 275. AuC 275 is a database that contains the algorithms for authenticating subscribers and includes the associated keys for encryption to safeguard the user input for authentication.

In the following, depending on context, the term "mobile subscriber" sometimes refers either to the end user and sometimes to the actual portable device used by an end user of the mobile cellular service. When a mobile subscriber turns on his or her mobile device, the mobile device goes through an attach process by which the mobile device attaches to an SGSN of the GPRS network. In FIG. 2B, when mobile subscriber 255 initiates the attach process by turning on the network capabilities of the mobile device, an attach request is sent by mobile subscriber 255 to SGSN 276. The SGSN 276 queries another SGSN, to which mobile subscriber 255 was attached before, for the identity of mobile subscriber 255. Upon receiving the identity of mobile subscriber 255 from the other SGSN, SGSN 276 requests more information from mobile subscriber 255. This information is used to authenticate mobile subscriber 255 to SGSN 276 by HLR 274. Once verified, SGSN 276 sends a location update to HLR 274 indicating the change of location to a new SGSN, in this case SGSN 276. HLR 274 notifies the old SGSN, to which mobile subscriber 255 was attached before, to cancel the location process for mobile subscriber 255. HLR 274 then notifies SGSN 276 that the location update has been performed. At this time, SGSN 276 sends an Attach Accept message to mobile subscriber 255, which in turn sends an Attach Complete message to SGSN 276.

After attaching itself with the network, mobile subscriber 255 then goes through the authentication process. In the authentication process, SGSN 276 sends the authentication information to HLR 274, which sends information back to SGSN 276 based on the user profile that was part of the user's initial setup. The SGSN 276 then sends a request for authentication and ciphering to mobile subscriber 255. The mobile subscriber 255 uses an algorithm to send the user identification (ID) and password to SGSN 276. The SGSN 276 uses the same algorithm and compares the result. If a match occurs, SGSN 276 authenticates mobile subscriber 255.

Next, the mobile subscriber 255 establishes a user session with the destination network, corporate network 289, by going through a Packet Data Protocol ("PDP") activation process. Briefly, in the process, mobile subscriber 255 requests access to the Access Point Name ("APN"), for example, UPS.com (e.g., which can be corporate network 279 in FIG. 3) and SGSN 276 receives the activation request from mobile subscriber 255. SGSN 276 then initiates a Domain Name Service ("DNS") query to learn which GGSN node has access to the UPS.com APN. The DNS query is sent to the DNS server within the core network 270, such as DNS 277, which is provisioned to map to one or more GGSN nodes in the core network 270. Based on the APN, the mapped GGSN 278 can access the requested corporate network 279. The SGSN 276 then sends to GGSN 278 a Create Packet Data Protocol ("PDP") Context Request message that contains necessary information. The GGSN 278 sends a Create PDP Context Response message to SGSN 276, which then sends an Activate PDP Context Accept message to mobile subscriber 255.

Once activated, data packets of the call made by mobile subscriber 255 can then go through radio access network 260, core network 270, and interconnect network 280, in particular fixed-end system or Internet 284 and firewall 288, to reach corporate network 289.

Thus, network elements that may implicate the functionality of the weather reporting collection and reporting in accordance with the invention may include but are not limited to Gateway GPRS Support Node tables, Fixed End System router tables, firewall systems, VPN tunnels, and any number of other network elements as required by the particular digital network.

Figure 2C:
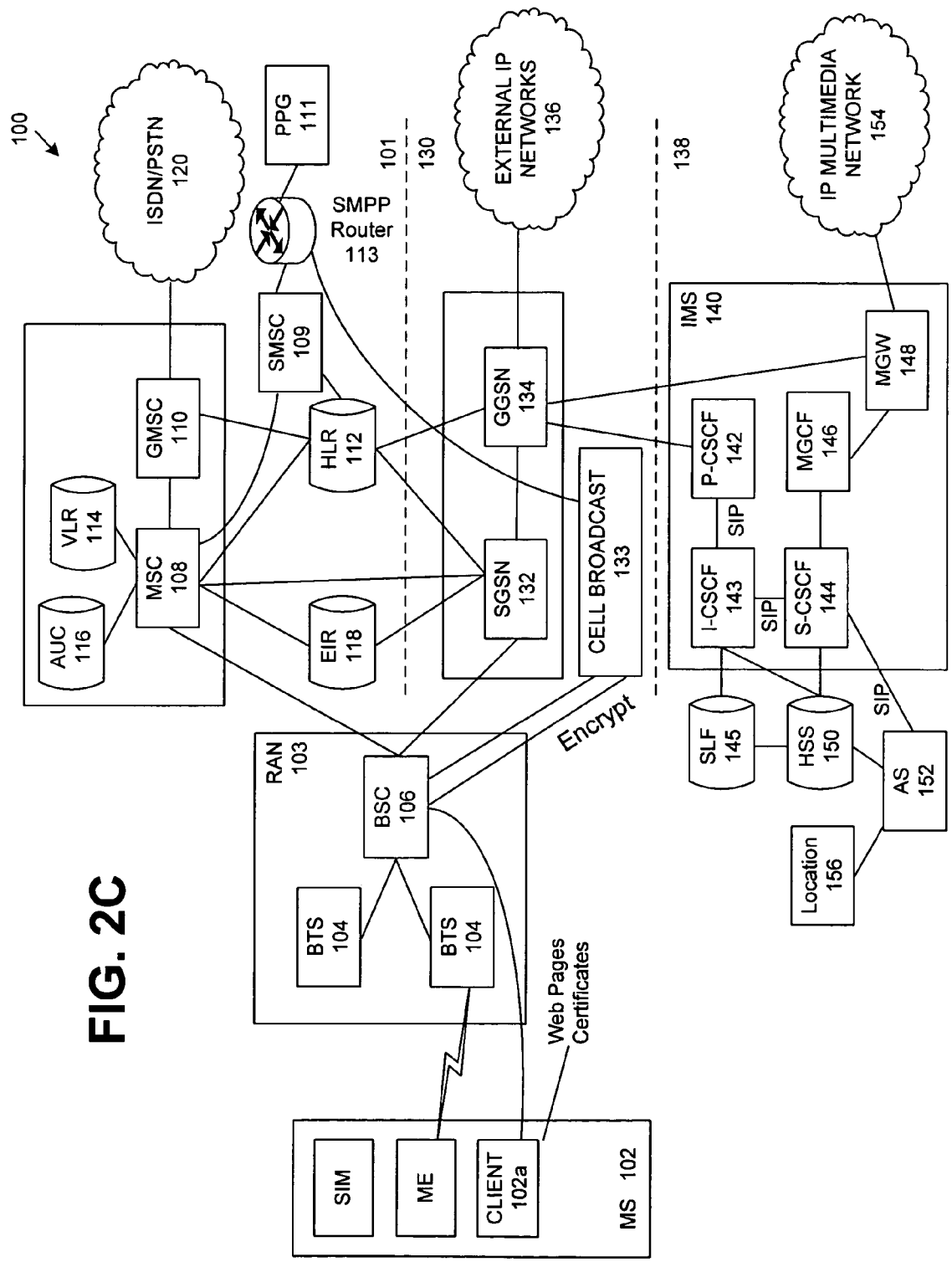
FIG. 2C illustrates an exemplary GSM/GPRS/IP multimedia network architecture in which the invention may be employed.

FIG. 2C shows another exemplary block diagram view of a GSM/GPRS/IP multimedia network architecture 100 in which the weather data collection and reporting of the present invention may be incorporated. As illustrated, architecture 100 of FIG. 2C includes a GSM core network 101, a GPRS network 130 and an IP multimedia network 138. The GSM core network 101 includes a Mobile Station (MS) 102, at least one Base Transceiver Station (BTS) 104 and a Base Station Controller (BSC) 106. The MS 102 is physical equipment or Mobile Equipment (ME), such as a mobile phone or a laptop computer that is used by mobile subscribers, with a Subscriber identity Module (SIM). The SIM includes an International Mobile Subscriber Identity (IMSI), which is a unique identifier of a subscriber. The BTS 104 is physical equipment, such as a radio tower, that enables a radio interface to communicate with the MS. Each BTS may serve more than one MS. The BSC 106 manages radio resources, including the BTS. The BSC may be connected to several BTSs. The BSC and BTS components, in combination, are generally referred to as a base station (BSS) or radio access network (RAN) 103.

The GSM core network 101 also includes a Mobile Switching Center (MSC) 108, a Gateway Mobile Switching Center (GMSC) 110, a Home Location Register (HLR) 112, Visitor Location Register (VLR) 114, an Authentication Center (AuC) 118, and an Equipment Identity Register (EIR) 116. The MSC 108 performs a switching function for the network. The MSC also performs other functions, such as registration, authentication, location updating, handovers, and call routing. The GMSC 110 provides a gateway between the GSM network and other networks, such as an Integrated Services Digital Network (ISDN) or Public Switched Telephone Networks (PSTNs) 120. In other words, the GMSC 110 provides interworking functionality with external networks.

The HLR 112 is a database that contains administrative information regarding each subscriber registered in a corresponding GSM network. The HLR 112 also contains the current location of each MS. The VLR 114 is a database that contains selected administrative information from the HLR 112. The VLR contains information necessary for call control and provision of subscribed services for each MS currently located in a geographical area controlled by the VLR. The HLR 112 and the VLR 114, together with the MSC 108, provide the call routing and roaming capabilities of GSM. The AuC 116 provides the parameters needed for authentication and encryption functions. Such parameters allow verification of a subscriber's identity. The EIR 118 stores security-sensitive information about the mobile equipment.

A Short Message Service Center (SMSC) 109 allows one-to-one Short Message Service (SMS) messages to be sent to/from the MS 102. A Push Proxy Gateway (PPG) 111 is used to "push" (i.e., send without a synchronous request) content to the MS 102. The PPG 111 acts as a proxy between wired and wireless networks to facilitate pushing of data to the MS 102. A Short Message Peer to Peer (SMPP) protocol router 113 is provided to convert SMS-based SMPP messages to cell broadcast messages. SMPP is a protocol for exchanging SMS messages between SMS peer entities such as short message service centers. It is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 102 sends a location update including its current location information to the MSC/VLR, via the BTS 104 and the BSC 106. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 130 is logically implemented on the GSM core network architecture by introducing two packet-switching network nodes, a serving GPRS support node (SGSN) 132, a cell broadcast and a Gateway GPRS support node (GGSN) 134. The SGSN 132 is at the same hierarchical level as the MSC 108 in the GSM network. The SGSN controls the connection between the GPRS network and the MS 102. The SGSN also keeps track of individual MS's locations and security functions and access controls.

A Cell Broadcast Center (CBC) 133 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 134 provides a gateway between the GPRS network and a public packet network (PDN) or other IP networks 136. That is, the GGSN provides interworking functionality with external networks, and sets up a logical link to the MS through the SGSN. When packet-switched data leaves the GPRS network, it is transferred to an external TCP-IP network 136, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one of three distinct classes: Class A, Class B, and Class C. An MS that can attach to the network for both GPRS services and GSM services simultaneously is categorized as Class A. The Class A MS also supports simultaneous operation of GPRS services and GSM services. For example, Class A mobile devices can receive GSM voice/data/SMS calls and GPRS data calls at the same time.

A Class B MS can attach to the network for both GPRS services and GSM services simultaneously. However, unlike Class A, a Class B MS does not support simultaneous operation of the GPRS services and GSM services. That is, a Class B MS can only use one of the two services at a given time.

An MS that can attach for only one of the GPRS services and GSM services at a time is categorized as Class C. Simultaneous attachment and operation of GPRS services and GSM services is not possible with a Class C MS.

A GPRS network 130 can be designed to operate in three network operation modes (NOM1, NOM2 and NOM3). A network operation mode of a GPRS network is indicated by a parameter in system information messages transmitted within a cell. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS, In a NOM2 network, a MS may not receive pages from a circuit switched domain when engaged in a data call, since the MS is receiving data and is not listening to a paging channel In a NOM3 network, a MS can monitor pages for a circuit switched network while receiving data and vice-versa.

The IP multimedia network 138 was introduced with 3GPP Release 5, and includes an IP multimedia subsystem (IMS) 140 to provide rich multimedia services to end users. A representative set of the network entities within the IMS 140 are a call/session control function (CSCF), a media gateway control function (MGCF) 146, a media gateway (MGW) 148, and a master subscriber database, called a home subscriber server (HSS) 150. The HSS 150 may be common to the GSM network 101, the GPRS network 130 as well as the IP multimedia network 138.

The IP multimedia system 140 is built around the call/session control function, of which there are three types: an interrogating CSCF (I-CSCF) 143, a proxy CSCF (P-CSCF) 142, and a serving CSCF (S-CSCF) 144. The P-CSCF 142 is the MS's first point of contact with the IMS 140. The P-CSCF 142 forwards session initiation protocol (SIP) messages received from the MS to an SIP server in a home network (and vice versa) of the MS. The P-CSCF 142 may also modify an outgoing request according to a set of rules defined by the network operator (for example, address analysis and potential modification).

The I-CSCF 143, forms an entrance to a home network and hides the inner topology of the home network from other networks and provides flexibility for selecting an S-CSCF. The I-CSCF 143 may contact a subscriber location function (SLF) 145 to determine which HSS 150 to use for the particular subscriber, if multiple HSS's 150 are present. The S-CSCF 144 performs the session control services for the MS 102. This includes routing originating sessions to external networks and routing terminating sessions to visited networks. The S-CSCF 144 also decides whether an application server (AS) 152 is required to receive information on an incoming SIP session request to ensure appropriate service handling. This decision is based on information received from the HSS 150 (or other sources, such as an application server 152). The AS 152 also communicates to a location server 156 (e.g., a Gateway Mobile Location Center (GMLC)) that provides a position (e.g., latitude/longitude coordinates) of the MS 102.

The HSS 150 contains a subscriber profile and keeps track of which core network node is currently handling the subscriber. It also supports subscriber authentication and authorization functions (AAA). In networks with more than one HSS 150, a subscriber location function provides information on the HSS 150 that contains the profile of a given subscriber.

The MGCF 146 provides interworking functionality between SIP session control signaling from the IMS 140 and ISUP/BICC call control signaling from the external GSTN networks (not shown). It also controls the media gateway (MGW) 148 that provides user-plane interworking functionality (e.g., converting between AMR- and PCM-coded voice). The MGW 148 also communicates with other IP multimedia networks 154.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones, but in accordance with the invention, the predefined area can be associated with a nearby BTS such that weather reporting data can be messaged to devices in the pre-defined area.

Wireless Wide Area Network (WWAN) Weather Reporting Services

As discussed in the background, historically, people interested in learning about weather conditions relating to a particular area via portable wireless devices have had few options. They can listen to TV or radio broadcasts that purport to be relevant to the listener, or if they have a portable device that is packet switching enabled for connection to the Internet, they can retrieve a Web site, enter in some rough location information, in order to retrieve weather conditions that are purported relevant to the entered location information. However, as discussed, the results in either case, are not too granular leading to potentially irrelevant results to the user. Moreover, neither technique lends itself to real-time retrieval of weather information. In the broadcast case, a user must wait for the purportedly relevant information to be presented along with a variety of irrelevant information, and in the Web case, a user must retrieve the data via a series of painfully slow data transfers of information as the user initially retrieves and interacts with the Web sites.

Accordingly, the invention provides systems and methods for reporting atmospheric condition and other weather data with improved reliability and relevancy of reporting of atmospheric condition data, faster access to the data, and with more geographically granular collection of data. The invention enables a service for the wireless wide area network ("WWAN") industry, for both the network side and the device side.

Figure 3A:
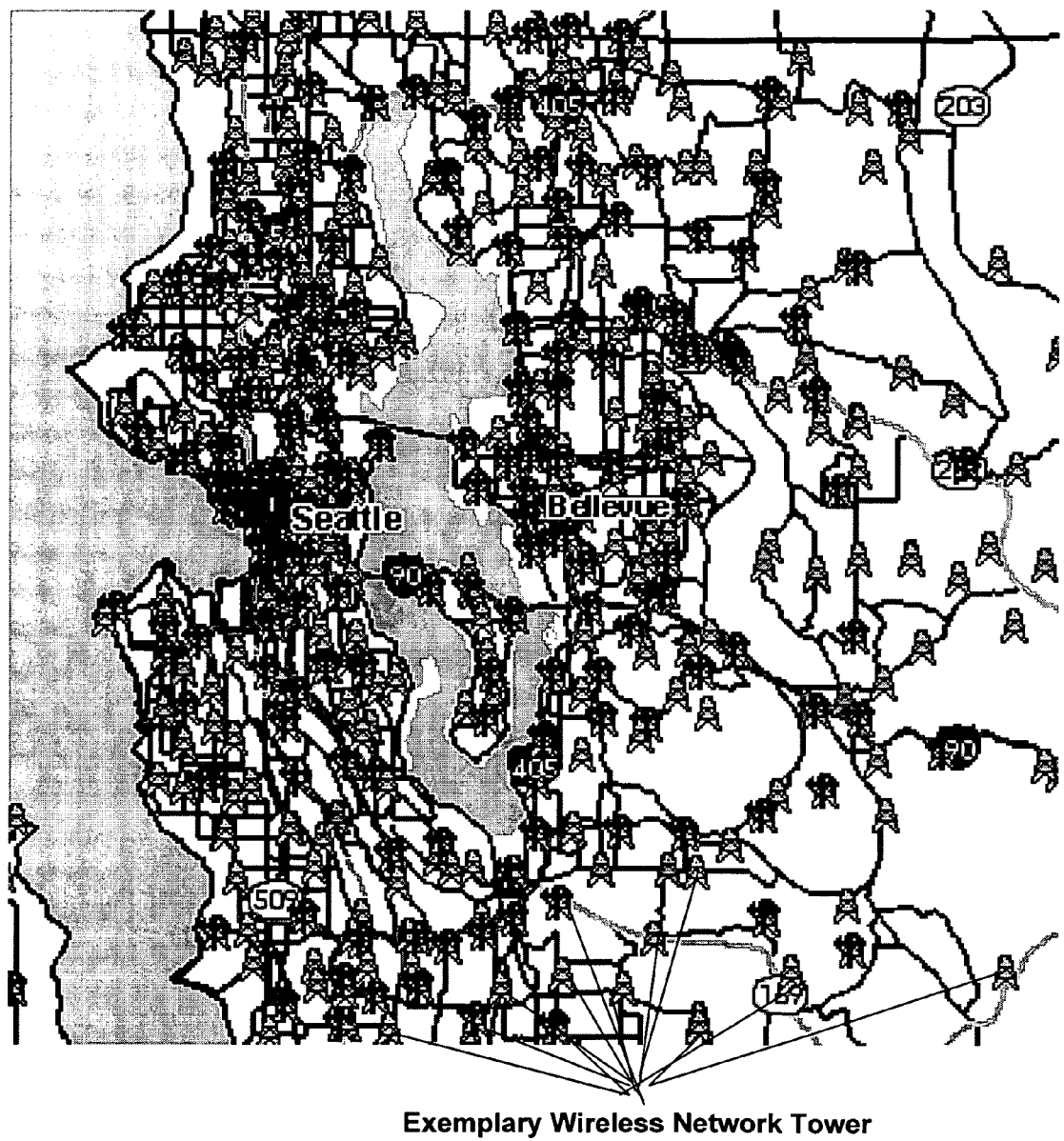
FIGS. 3A and 3B illustrate exemplary granularity of existing wireless wide area network ("WWAN") tower structures in the Seattle Market, and how that granularity compares to the more coarse granularity of METAR sites.
Figure 3B:
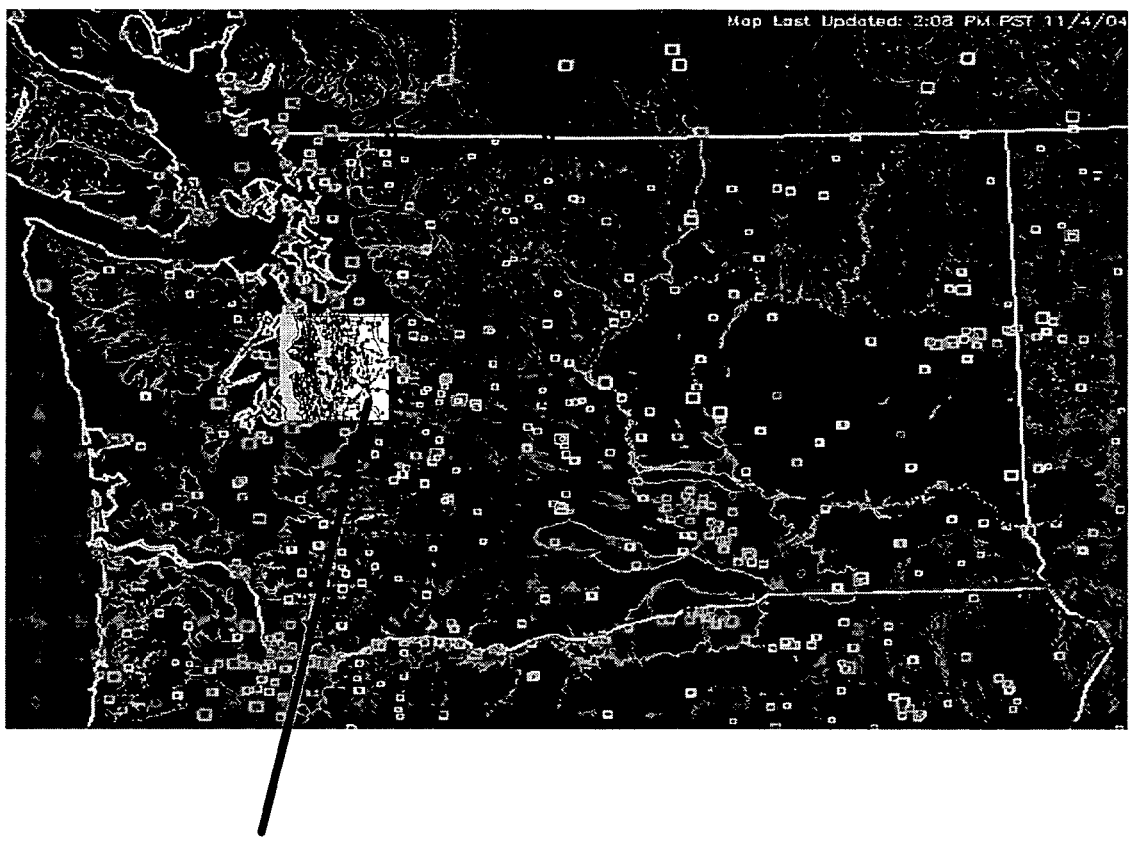

To measure data, the invention incorporates available weather observing instruments (for a simple example, a thermometer) onto WWAN towers with integrated features and services. In contrast to METAR sites and Web site granularities broken down by zip code, WWAN towers provide a dense set of structures in urban and rural areas alike. This can be observed by comparing the granularities illustrated in FIGS. 3A and 3B. In FIG. 3A, the network tower sites of a sample network operator are shown for the area in or near Seattle, Wash., USA. One can readily observe that there are several hundred towers located nearby Seattle, Wash. alone. In FIG. 3B, the same square of FIG. 3A has been reduced in size to fit to scale on the map of FIG. 1 illustrating the METAR sites in Washington state. From this comparison alone, one can see that the granularity of network towers shown in FIG. 3A is much greater than the granularity provided by METAR sites.

Figure 3C:
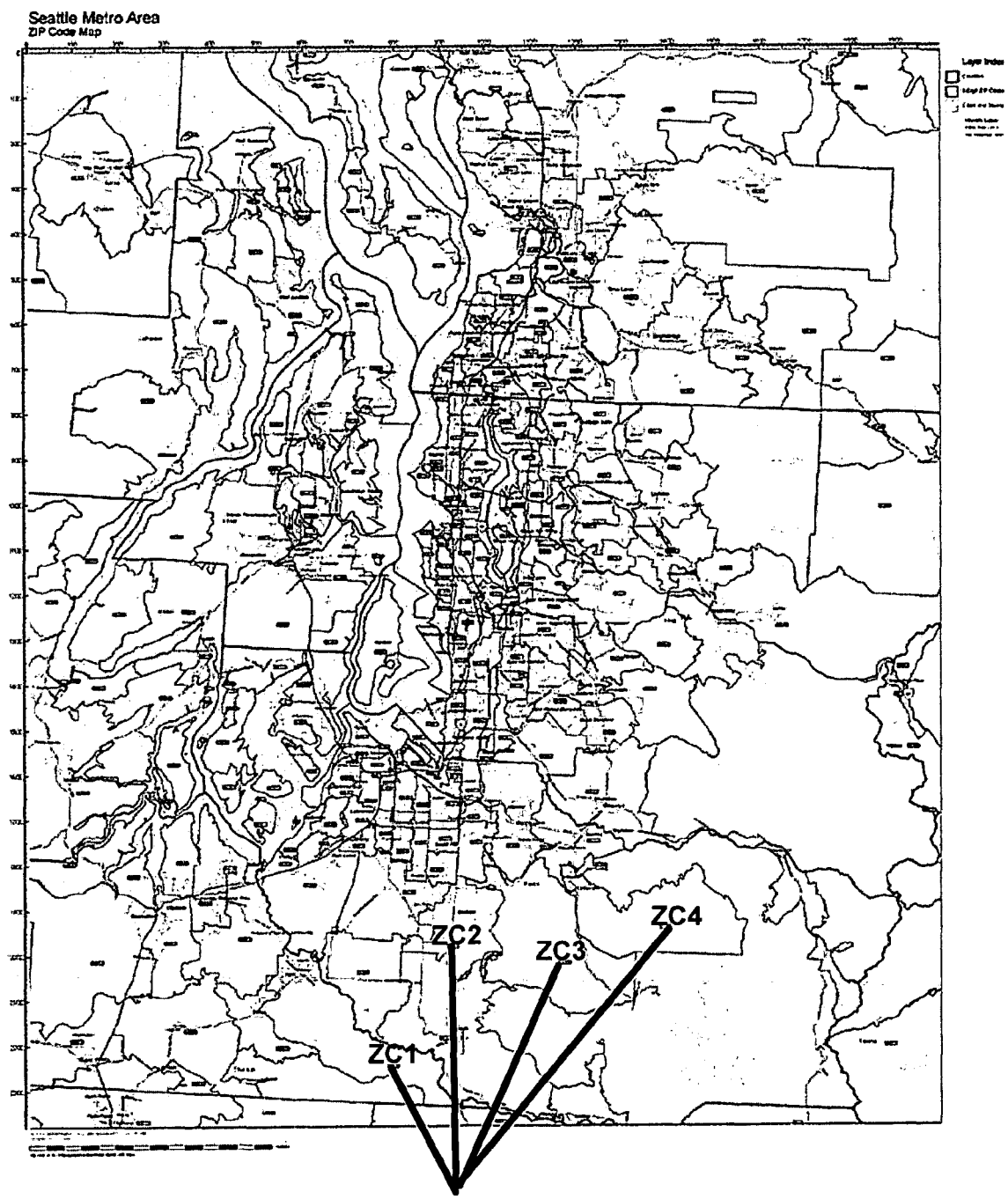
FIG. 3C illustrates exemplary granularity of existing zip codes in the Seattle Market.

FIG. 3C illustrates a similar distribution of Zip Codes, such as a first zip code ZC1, a second zip code ZC2, a third zip code ZC3 and a fourth zip code ZC4, near Seattle, WA. A quick inspection of the dispersion of zip code locations (exact zip codes not shown for any particular purpose herein) in or near Seattle, Wash. shows that the network towers of FIG. 3A are more densely spaced than the zip code locations of FIG. 3C. Accordingly, the invention recognizes that network towers provide a good proxy for granularity suited to reliable and relevant weather reporting, as compared to zip codes and METAR sites.

Thus, in one aspect, the invention locates weather instruments at the base of the tower structures so that a more accurate reading of atmospheric variables (e.g., temperature, dew point, barometric pressure, wind velocity, aerosol content, etc.) may be obtained. In one embodiment, the measuring equipment is situated on the tower structures above the ground (e.g., about 10 meters) in order to avoid what are known as Earth boundary layer effects, whereby the ambient temperature of the soil, and plant life thereon, can affect or interfere with the true atmospheric readings.

Measuring instruments that may be communicatively coupled to network towers in accordance with the invention may include, but are not limited to, any one or more of the following: anemometer (wind speed), aerometer (air weight and density), web bulb thermometer (dew point temperature, relative humidity), thermometer (temperature), barometer (barometric pressure), ceilometer (cloud cover/height), bryometer (phytotoxic air pollution) and other pollution measuring instruments. Other weather measuring instruments which may reasonably be communicatively coupled to, such as attached to, network towers should be apparent to those in the meteorological and weather reporting arts as well, and accordingly this list should be considered exemplary, and non-exhaustive.

Figure 4A:
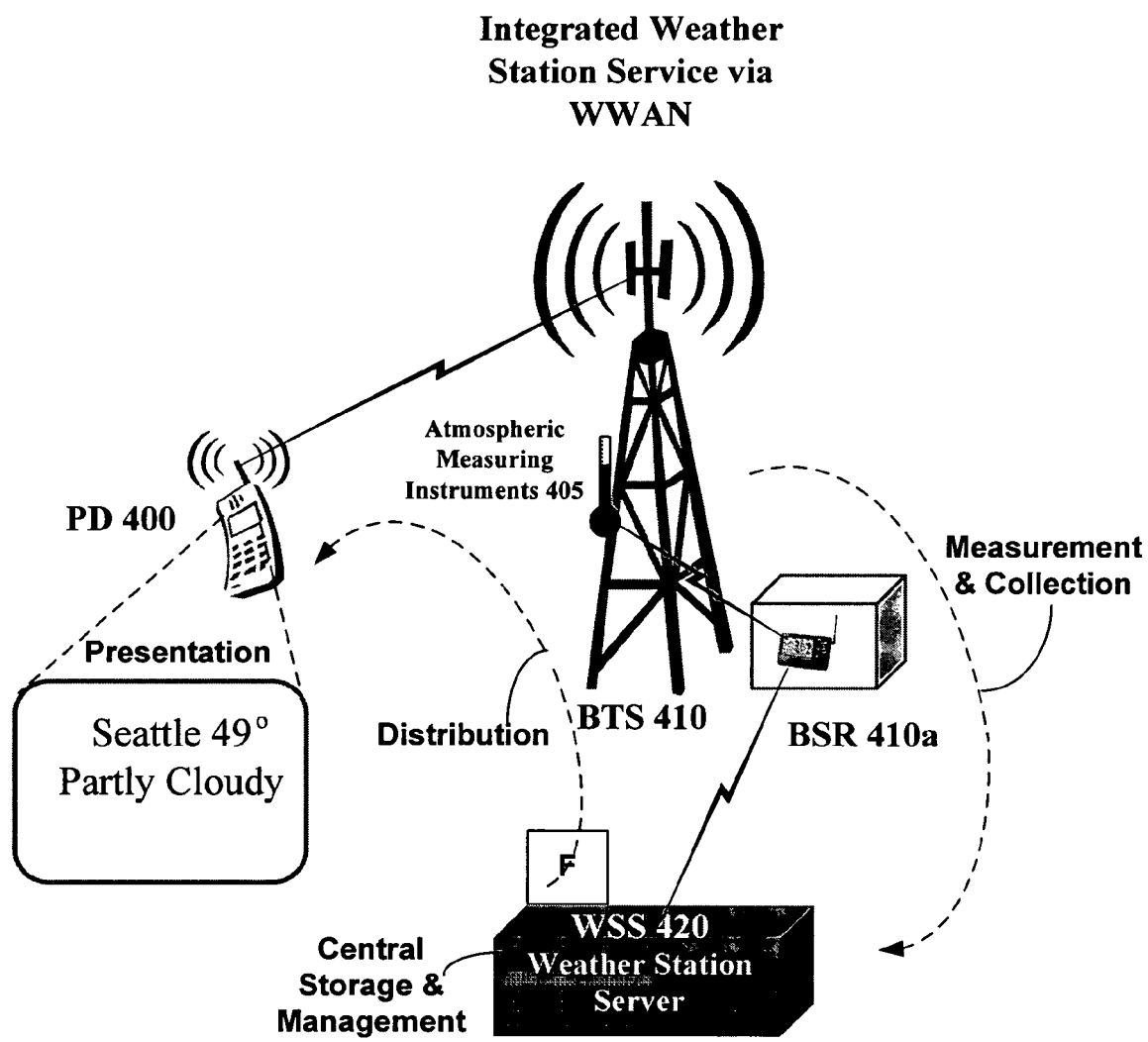
FIG. 4A is an exemplary non-limiting block diagram of a WWAN weather station and services architecture in accordance with the present invention.

FIG. 4A is a block diagram illustrating various capabilities introduced by the present invention. As mentioned above, in one aspect of the invention, weather measuring instruments are placed at a variety of respective network towers (though not necessarily every network tower) to enable a desired geographical granularity of weather data reporting. Thus, as illustrated in FIG. 4A, atmospheric measuring instrument(s) 405, such as a thermometer or the like, is coupled to the network tower BTS 410. Atmospheric measuring instrument(s) 405 are generally placed at a height that precludes Earth boundary layer effects, such as the ambient ground temperature, from affecting measurement accuracy. A network tower is suited for such positioning because network towers typically extend 30 meters or more in height. Accordingly, atmospheric measuring instrument(s) 405 can be coupled to the tower high enough over the ground, e.g., 10 meters or higher, for greater accuracy and independence of measurement. Additionally, to the extent that many towers are positioned away from or higher than buildings, which can shield measurements such as wind, snow, or rain, and alter characteristics such as temperature, the use of network towers generally avoids artificial effects on measurements that may be encountered from man-made structures.

However, it should be understood that the invention may be applied to a variety of communications network structures that may support a transceiver for sending and/or receiving data to mobile devices in a communications network. For instance, building roof-tops are sometimes utilized in metropolitan areas as an alternative. There are also different tower structures such as transmission towers and self-support towers that may be employed in a network. Moreover, sometimes pole structures, such as monopoles, tree poles, etc., are utilized as an alternative to tower structures. Natural structures, such as hill tops and mountain peaks, may also be well suited to use as a communications network structure as well. In this respect, for the avoidance of doubt, the term "communications network structure" should be defined to encompass any such structure (roof-tops, pole structures, tower structures, natural structures, etc.) utilized in a mobile communications network to transmit/receive communications data in the network, whereby one or more atmospheric condition measuring instruments can be placed on, at or nearby the communications network structure.

Figure 4B:
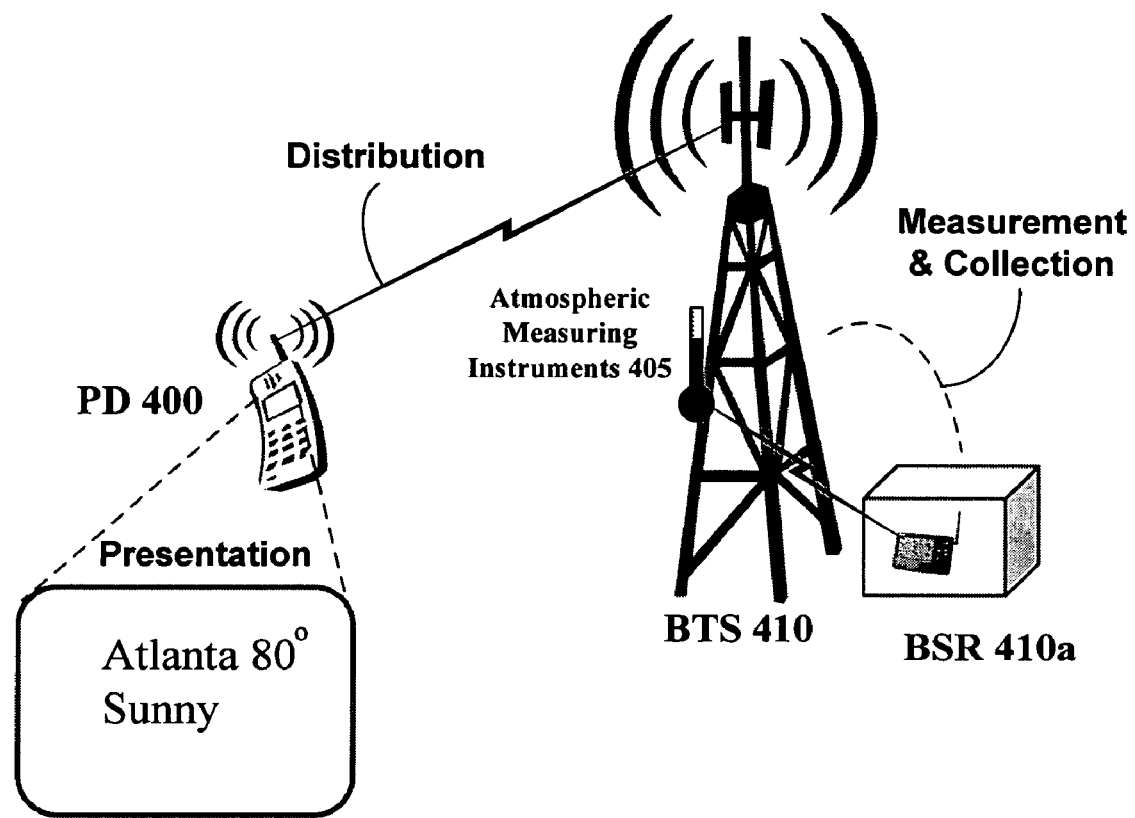
FIG. 4B is an exemplary non-limiting block diagram of an alternative weather services architecture of the present invention.

FIG. 4B illustrates an exemplary non-limiting block diagram of an alternate weather services architecture of the present invention, which is independent of the existence of a mobile communications network. In FIG. 4B, for instance, weather condition data is recorded at BTS 410 such that BTS 410 can deliver the weather condition data directly to a portable device 400 within communications range of the BTS 410. For instance, BTS 410 may be a pico cell, and a nearby portable device may make a request for weather condition data taken by instruments 405 and recorded via BTS 410 and/or BTR 410a. Alternatively, whenever a portable device is nearby a BTS 410, the weather condition data can automatically be transmitted to the portable device. Any wireless means for delivering the weather condition data is suitable including Bluetooth, radio broadcast, etc. Thus, in this embodiment, BTS 410 can be standalone, and not incorporated as part of a larger network. As will be described below in more detail, weather condition data can be transmitted from portable device to portable device in accordance with the invention as well.

Figure 5A:
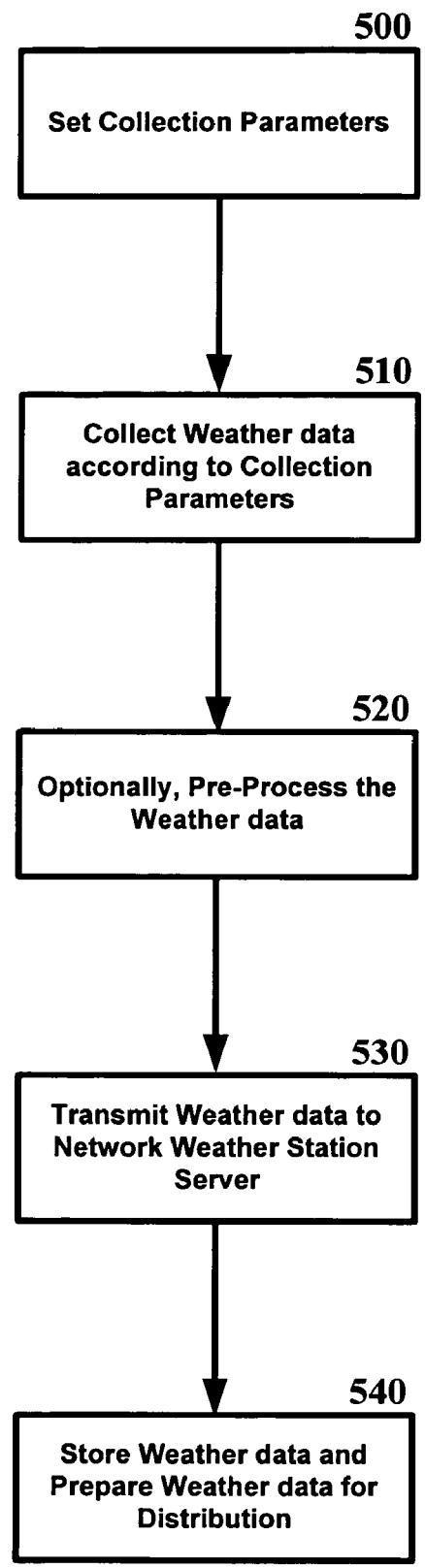
FIGS. 5A and 5B are exemplary non-limiting flow diagrams showing collection of weather data and distribution of the weather data, respectively, in the WWAN weather station and services architecture of the present invention.

FIG. 5A illustrates this overall collection process in an exemplary, non-limiting flow diagram. At 500, the collection parameters for the system are set, i.e., having positioned a variety of atmospheric measuring instruments at the network towers, a system administrator sets (or later changes) the regularity, duration, level of digit significance, etc. for the measurements of the weather data to be taken. Instead of the system administrator, in an alternate embodiment, the network dynamically tunes its recording characteristics to take into account available network bandwidth, storage limits, demand by end users for certain applications/services, etc. Once the weather data collection parameters have been set, the system at 510 proceeds to collect atmospheric condition data from the atmospheric measuring devices according to the weather data collection parameters. Optionally, at 520, some pre-processing of the weather data may be performed prior to transmitting the data to a weather station node on the network at 530. At 540, the weather data is stored, and can be prepared for distribution to end users by pre-calculating or pre-filtering the data to reflect its relevancy to end users.

The data may be collected from atmospheric measuring instruments 405 at a desired regularity, as generally determined by the instrument. Temperature, for instance, is a fairly stable measurement at any one given moment, and accordingly, appropriate measurements may only need to be taken every minute. Wind speed, in contrast, can change quickly, and accordingly, more regular measurements might be taken for wind measurements. Each BTS 410 generally includes a base station room BSR 410a, which is located near the network tower, to house and protect various electronic, communications and power equipment associated with connecting the network tower to the rest of the communications network. In this regard, in one embodiment of the invention, an intermediate device may be placed in BSR 410a which directly collects the atmospheric data from the atmospheric measuring instruments 405, and forwards the data to one or more weather station servers WSS 420. Optionally, some pre-processing (data processing, compression, encryption, etc.) of the atmospheric data may be performed prior to such forwarding WSS 420, otherwise the WSS 420 generally handles the aggregation, processing and management of the data on behalf of the user. While WSS 420 may be one or more servers and associated databases for storage of the weather data, WSS 420 provides a centralized abstraction for collecting the tower weather data in accordance with the invention.

In accordance with another aspect of the invention, a portable device with wireless communications capabilities, such as a mobile phone, PDA, blackberry device, handheld gaming system, portable media center, pager, etc., can receive one or more relevant pieces of weather data according to one or more services. Thus, as illustrated in FIG. 4, once the data is collected, it may be distributed to an end user having a connected portable device PD 400, such as a cellular telephone. One or more system-defined or end-user-defined filters F are placed on the data prior to its distribution to PD 400 to ensure maximum relevancy of the data to the end user. For instance, an end user with PD 400 turns on PD 400, initiates a connection to the network via the nearest network tower. Once connected to the network via a physical network tower, the geographic location of PD 400 is also known to be within the area as a reasonable assumption. Accordingly, the network can be set up to automatically present the relevant weather data to the user. For instance, it might be 49 degrees Fahrenheit in Seattle, and partly cloudy, as shown in FIG. 4. In one embodiment, the weather data reporting is presented as part of a "home" or "system" screen for PD 400. In another embodiment, a user activates the presentation of weather data via a software selection (e.g., touch screen), or by activating one or more hardware inputs, such as buttons.

In another embodiment, a separate GPS ("global positioning satellite") measurement can be recorded by PD 400, and the network can perform weighted averages of weather data depending upon the exact location of the PD 400 relative to towers recording weather data near the user. The weather data can be distributed to PD 400 via any available network channel, whether the control channel, the voice/data channel or a broadcast channel (e.g., for emergency storm warnings, and the like). Short message service (SMS) text messaging could also be utilized to deliver weather data, such as emergency warnings.

Figure 5B:
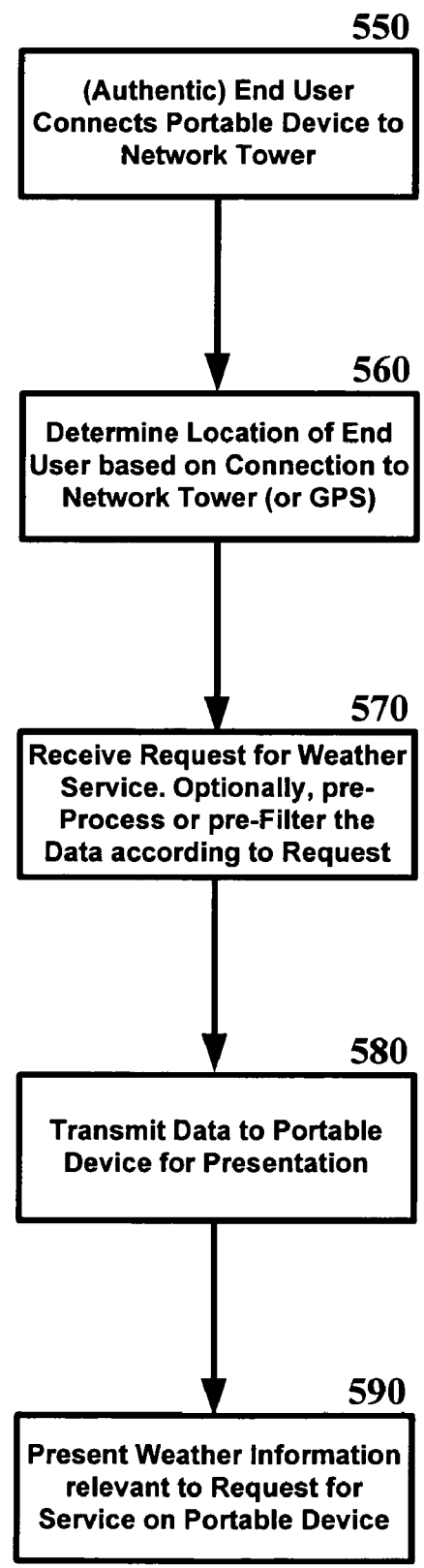

In FIG. 5B, illustrating an exemplary, non-limiting flow diagram for the distribution of weather data, at 550, if a portable device is not connected to the network, then the flow waits until a connection is made, authentication takes place, etc. Once connected to the network, at 560, the approximate location of the portable device is known due to its proximity to its connecting tower. At 570, the portable device either automatically makes a request for certain atmospheric condition data based on settings, or the user of the portable device may explicitly make the request for such service. Optionally, the data may be processed, and filtered based on the request from the portable device prior to its transmission to the portable device. However, in recognition that some portable device's have ample processing and storage, some or all of such processing of the weather data could take place on the portable device. At 580, the requested data is transmitted to the portable device by the weather station node of the network that collects weather measurement data from the various tower positions in the network, as described above in more detail. Lastly, the data is received and processed by the portable device at 590 based on the request for weather service. For instance, for a relatively simple request for the current temperature, the temperature can be displayed on the screen UI of the portable device (see, e.g., FIG. 4). However, one can appreciate that the weather data, once requested and received, can be translated to voice output, or otherwise output in one or more formats that are suited to satisfying the request for weather service according to the invention. The UI embodiment could include a scrolling feed of weather information to conserve screen space.

Depending on the data involved for a respective weather service enabled by a weather station server in accordance with the invention, the portable device can retrieve new weather information periodically, retrieve new weather information at a dynamic rate, e.g., where necessary to meet higher priority network bandwidth demands and/or retrieve new weather information based on specific requests from the user.

In still yet another embodiment, the invention may be applied from the perspective of a portable device to another portable device. For instance, a first user of a first portable device, such as a cell phone, might call a friend in a different geographical location at the friend's second portable device. If the first user of the first portable device is interested in knowing how the weather is near the friend's second portable device, the invention enables weather condition data that applies to the second portable device to be sent to the first user of the first portable device for display on the first portable device. For instance, if Sam in Atlanta calls Rachel in Seattle, and Sam wants to know how the weather is near Rachel, the invention enables such weather condition data to be transmitted to Sam's phone either by the weather station server, or from the second portable device to the first portable device. The transmission of the weather condition data can happen automatically, at the request of the first user, optionally at the approval of the second user, and/or according to data transmission priorities existing in the network.

Thus, the invention also enables methods for displaying weather condition data where a first portable device connects to a second portable device via a communications network. Then, a request is made (initiated by the user, or automatically) by the first portable device for weather condition data pertaining to the second portable device. Since, as described above, the weather condition data pertaining to the second portable device has been measured at a communications network structure near the second portable device and stored at a weather station server, the weather condition can be sent to the first portable device in at least two ways. First, the weather data pertaining to the second portable device can be transmitted to the first portable device directly from the weather station server, or the second portable device can initiate a transfer of weather condition data stored locally at the second portable device. Finally, the first portable device receives the requested weather condition data from the second portable device via a control channel, a voice channel, an SMS broadcast and/or a broadcast channel of the communications network so that the weather condition data can be displayed on the first portable device.

In this embodiment, a step may be introduced whereby the friend must approve of the request for weather condition data, whereby the first user must wait for the friend to authorize the receiving of the requested weather condition data. Alternatively, the requesting and receiving of the weather condition data can occur automatically after connecting the first portable device to the second portable device. As another alternative, a user activates a weather service of the first portable device, thereby initiating a request for weather reception data.

Thus, in accordance with the invention, subscribers can access the measurements taken at network towers on demand (or via broadcast) through a variety of wireless devices. Customers can be individual wireless subscribers, weather report organizations, or national and educational organizations. For example, the WWAN weather station services can be used as an alert to a sudden change of wind speeds, temperatures for national security or even for an educational research or study of wind, temperature and/or humidity patterns. Thus, independent of the request for services according to the invention that a user of a portable device can make, one can appreciate that the collection of data at the weather station server on the network would make for an excellent repository of meteorological data and conditions that could be mined for patterns, researched, etc. to the benefit of all, to form weather maps, to create time-lapse videos, charts, graphs, etc.

While the present invention has been described in connection with the preferred embodiments of the various figures, it is to be understood that other similar embodiments may be used or modifications and additions may be made to the described embodiment for performing the same function of the present invention without deviating therefrom. For example, one skilled in the art will recognize that the present invention as described in the present application may apply to any environment, whether wired or wireless, and may be applied to any number of such devices connected via a communications network and interacting across the network. For instance, the data from the weather measuring instruments placed on network towers in accordance with the invention can be reported to the weather station server of the invention via wired or wireless means, or a combination thereof. Moreover, the weather measuring instruments of the invention need not be physically located on the tower itself. For instance, the base station room, a nearby tree, etc. may be better suited for the collection of weather data. Therefore, the present invention should not be limited to any single embodiment, but rather should be construed in breadth and scope in accordance with the appended claims.

What is claimed:

1. A communications network structure for transmitting communications data, comprising:

a transceiver for at least transmitting data to one or more portable devices communicatively coupled to the transceiver;

a network tower for elevating and stabilizing the transceiver;

at least one atmospheric condition measuring instrument coupled to the network tower that measures an atmospheric condition associated with an atmosphere surrounding the communications network structure yielding measured data and transmits the measured data to at least one atmospheric condition recording device located on, at or nearby the network tower; and wherein the transceiver is configured to transmit, in response to receiving a request for atmospheric information from at least one of the one or more portable devices, the measured data to the at least one of the one or more portable devices.

2. A communications network structure according to claim 1, wherein the at least one atmospheric condition measuring instrument includes a thermometer.

3. A communications network structure according to claim 1, wherein the at least one atmospheric condition measuring instrument includes at least one of an anemometer, an aerometer, a web bulb thermometer, a thermometer, a barometer, a ceilometer or a pollution measuring instrument.

4. A communications network structure according to claim 1, wherein the network tower comprises a plurality of supports, and the at least one atmospheric condition measuring instrument is attached to at least one support of the plurality of supports.

5. A communications network structure according to claim 4, wherein the at least one atmospheric condition measuring instrument is elevated a predetermined distance relative to the ground to avoid boundary layer effects.

6. A communications network structure according to claim 5, wherein the at least one atmospheric condition measuring instrument is elevated at least 10 meters relative to the ground.

7. A method for collecting weather condition data in a mobile communications network comprising a plurality of communications network towers, comprising:

providing at least one atmospheric condition measuring instrument coupled to each of the plurality of communications network towers;

for each of the plurality of communications network towers, measuring with the at least one atmospheric condition measuring instrument at least one atmospheric condition associated with an atmosphere surrounding the respective communications network towers;

based on the measuring, storing weather condition data by at least one atmospheric condition data recording device coupled to one or more of the plurality of communications network towers;

receiving a request for a subset of the weather condition data from at least one mobile device; and transmitting the subset of the weather condition data to the at least one mobile device.

8. A method according to claim 7, wherein the measuring includes measuring temperature with a thermometer.

9. A method according to claim 7, wherein the measuring includes at least one of measuring wind speed with an anemometer, measuring air density or weight with an aerometer, measuring dew point temperature with a web bulb thermometer, measuring barometric pressure with a barometer, measuring cloud cover/height with a ceilometer, or measuring phytotoxic air pollution with a bryometer.

10. A method according to claim 7, wherein the providing includes attaching at least one atmospheric condition measuring instrument to at least one support of the plurality of communications network towers.

11. A method according to claim 10, wherein the providing includes elevating the at least one atmospheric condition measuring instrument to a predetermined distance relative to the ground to avoid boundary layer effects.

12. A method according to claim 7, further comprising transmitting the weather condition data to at least one intermediate weather measurement recording device prior to transmitting the weather condition data to at least one weather station node.

13. A computer readable storage medium comprising computer executable instructions for performing measurement, storage and transmission of data according to claim 7.

14. A method for displaying weather condition data via a portable device connected to a wireless communications wide area network, comprising:

connecting the portable device to the wireless communications wide area network;

determining a closest communications network tower of a plurality of communications network towers to which the portable device is physically located;

receiving weather condition data, measured at the closest communications network tower and stored at a weather station node of the wireless communications wide area network, by the portable device via at least one of a control channel, a voice channel, an SMS broadcast or a broadcast channel of the wireless communications wide area network; and displaying the weather condition data via a display of the portable device.

15. A method according to claim 14, further comprising activating a weather service of the portable device by the user of the portable device, thereby initiating the determining, receiving and displaying.

16. A method according to claim 14, wherein the determining, receiving and displaying occurs at the request of the user of the portable device.

17. A method according to claim 14, wherein the receiving includes receiving the weather condition data by the portable device periodically.

18. A method according to claim 14, wherein the receiving includes receiving the weather condition data by the portable device based at least partially on a dynamic determination of network bandwidth availability.

19. A method according to claim 14, wherein the receiving includes receiving temperature data, the temperature data measured at the closest communications network tower and stored at the weather station node of the wireless communications wide area network, by the portable device.

20. A method according to claim 14, wherein the portable device is a cell phone.

21. A computer readable storage medium comprising computer executable instructions for performing the method of claim 14.

22. A communications network tower in a network comprising a plurality of communications network towers, the communications network tower for transmitting communications data to and from portable devices connected to the network, comprising:

a transceiver element which transmits and receives the communications data via the network;

the communications network tower which elevates and stabilizes the transceiver element;

at least one atmospheric condition measuring instrument located on, at or near the network tower that measures an atmospheric condition associated with the atmosphere surrounding the network tower, yielding measured data, and transmits the measured data to at least one atmospheric condition recording device located on, at or nearby the network tower; and wherein the transceiver element is configured to transmit the measured data to a portable device, in response to a request from the portable device.

23. A network tower according to claim 22, wherein the at least one atmospheric condition measuring instrument includes a thermometer.

24. A network tower according to claim 22, wherein the at least one atmospheric condition measuring instrument includes at least one of an anemometer, an aerometer, a web bulb thermometer, a thermometer, a barometer, a ceilometer or a pollution measuring instrument.

25. A network tower according to claim 22, wherein the network tower comprises a plurality of supports, and the at least one atmospheric condition measuring instrument is attached to at least one support of the plurality of supports.

26. A network tower according to claim 25, wherein the at least one atmospheric condition measuring instrument is elevated a predetermined distance relative to the ground to avoid boundary layer effects.

27. A network tower according to claim 26, wherein the at least one atmospheric condition measuring instrument is elevated at least 10 meters relative to the ground.

28. A method for displaying weather condition data via a portable device, comprising:
    wirelessly connecting the portable device to a communications network tower when the portable device is within communications range of the communications network tower;
    receiving weather condition data, measured at the communications network tower and stored at a weather station server communicatively coupled to the communications network tower, by the portable device via at least one of a control channel, a voice channel, an SMS broadcast and a broadcast channel; and
    displaying the weather condition data via a display of the portable device.

29. A method according to claim 28, further comprising activating a weather service of the portable device by a user of the portable device, thereby initiating at least the receiving and displaying.

30. A method according to claim 28, wherein the wirelessly connecting, receiving and displaying occur at the request of a user of the portable device for the weather condition data.

31. A method according to claim 28, wherein the receiving includes receiving the weather condition data by the portable device periodically.

32. A method according to claim 28, wherein the receiving includes receiving the weather condition data by the portable device based at least partially on a dynamic determination of the priority of the weather condition data relative to other tasks being performed at the same time.

33. A method according to claim 28, wherein the receiving includes receiving temperature data, the temperature data measured at the communications network tower and stored at the weather station server, by the portable device via at least one of a control channel, a voice channel, an SMS broadcast or a broadcast channel.

34. A method according to claim 28, wherein the portable device is a cell phone.

35. A computer readable storage medium comprising computer executable instructions for performing the method of claim 28.

36. A method for displaying weather condition data, comprising:
    connecting a first portable device to a second portable device via a communications network;
    requesting, by the first portable device, weather condition data pertaining to the second portable device, the weather condition data having been measured at a communications network tower of the communications network near the second portable device, stored at a weather station server of the communications network;
    receiving, by the first portable device, the requested weather condition data from the second portable device via at least one of a control channel, a voice channel, an SMS broadcast or a broadcast channel of the communications network; and
    displaying the weather condition data via a display of the first portable device.

37. A method according to claim 36, further comprising:
    waiting for a user of the second portable device to authorize the receiving of the requested weather condition data prior to initiating the receiving.

38. A method according to claim 36, wherein the requesting and receiving occur automatically after the connecting.

39. A method according to claim 36, further comprising activating a weather service of the first portable device by the user of the first portable device, thereby initiating at least the requesting, receiving and displaying.

40. A method according to claim 36, wherein the requesting includes requesting, by the first portable device, temperature data stored on the second portable device, the temperature data having been measured at a communications network tower of the communications network near the second portable device, stored at a weather station server of the communications network, and transmitted to the second portable device via the communications network.

41. A method according to claim 36, wherein the first portable device is a cell phone.

42. A computer readable storage medium comprising computer executable instructions for performing the method of claim 36.

* * * * *